April 12, 1949.   R. A. MOCK   2,467,331
STERILIZING BASKET
Filed March 13, 1947
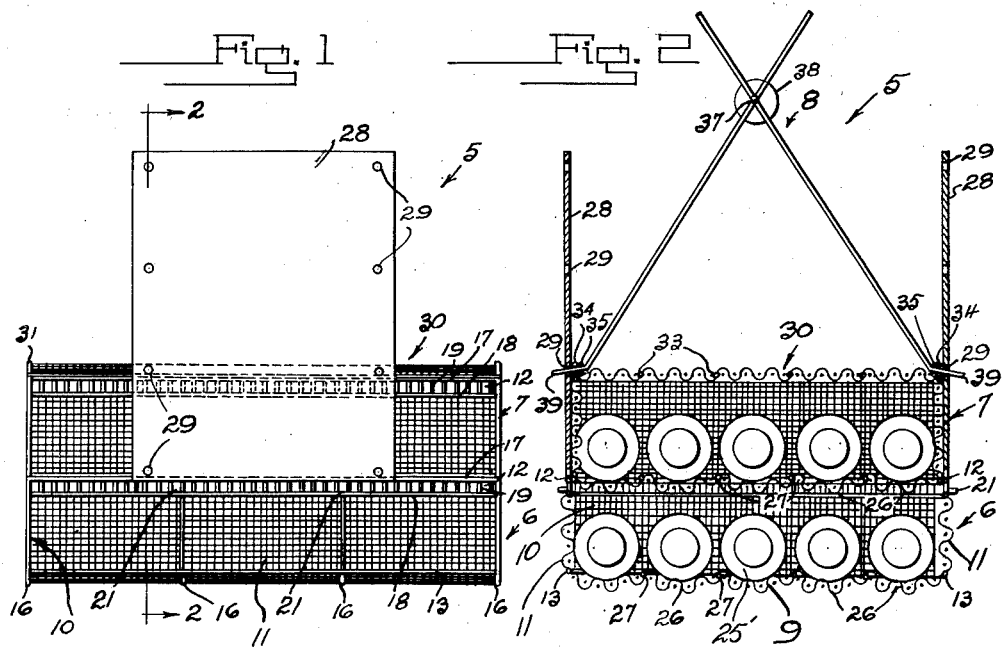
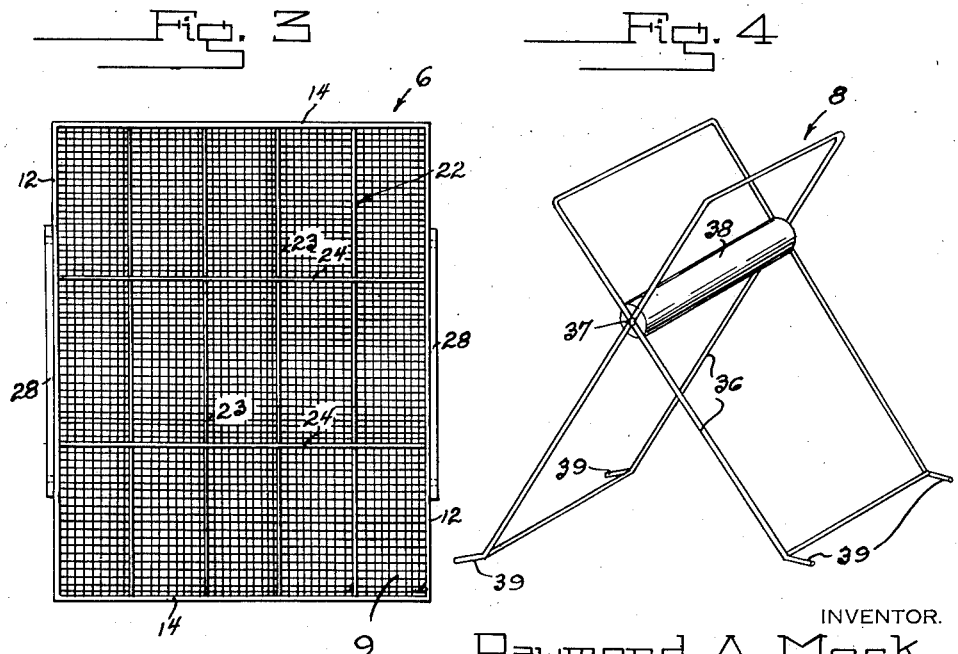
INVENTOR.
Raymond A. Mock
BY Lancaster, Allen & Rommel
ATTORNEYS.

Patented Apr. 12, 1949

2,467,331

UNITED STATES PATENT OFFICE 2,467,331

STERILIZING BASKET

Raymond A. Mock, Amarillo, Tex.

Application March 13, 1947, Serial No. 734,299

6 Claims. (Cl. 21—105)

This invention relates to wire mesh tray devices for holding a plurality of drinking glasses, cups, and other such articles while they are immersed in and removed from a vessel containing boiling water for sterilizing them, and more particularly to a unit of this type involving two or more trays in mutually supporting relation wherein the superjacent trays act as covers for the subjacent trays, and a handle acting to lock the trays together as well as to afford means whereby the unit may be carried to and immersed in the boiling water and removed therefrom without hands of the worker coming in contact with the boiling water, the contents of the trays, or the trays; the primary object of this invention being to provide a sterilizing unit of this character especially adapted for use in commercial establishments, such as hotels, restaurants, bars, and the like, where large capacity, ease of handling, elimination of breakage and chipping of the glasses and the like, and elimination of scalding and burning of workers' hands are important factors in the continuous maintenance of the sanitary conditions prescribed by law and which contribute materially to reduction of labor and replacement costs.

Another important object of this invention is to provide a unit of the character indicated above having unusually simple and rugged construction resisting the wear and tear of continued use and facilitating assembly and handling thereof, and enabling manufacture at a relatively low cost.

Other important objects and advantageous features of this invention will be apparent from the following description and accompanying drawings, wherein, for purposes of illustration only, a presently preferred embodiment is set forth in detail.

In the drawings:

Figure 1 is a general side elevation of said embodiment, with the handle removed, and showing the master tray and one of a possible plurality of cover trays.

Figure 2 is a transverse vertical section taken on the line 2—2 of Figure 1 and showing the handle in place.

Figure 3 is a top plan view of the master trays and,

Figure 4 is a perspective view of the handle, showing it in expanded position.

Referring in detail to the drawings, the numeral 5 designates the sterilizing unit as a whole, comprising the master tray 6, one or more cover trays 7 adapted to be stacked on the master tray, and the handle 8.

The master tray 6, which may be of any suitable plan shape, herein shown as elongated rectangular, comprises a pan shape including a wire-mesh bottom 9, end walls 10, 10 and side walls 11, 11, reinforced by a heavy wire frame consisting of upper and lower longitudinal members 12, 13, and upper transverse end members 14, said longitudinal members being parallelly spaced and connected by several U-shaped transverse members 16 which are arranged at intervals along the horizontal members and at their ends and extend transversely across the bottom 9 between the lower longitudinal members 13. As shown in Figure 1, the upper longitudinal members 12 consist of parallel spaced bars or wires 17 and 18 connected together by short vertical bars or wires 19 spaced from each other at regular distances greater than the width of the apertures in the wire mesh 20 covering the tray frame. The bars 17, 18 and 19 provide additional rigidity and reinforcement for the tray and afford keeper apertures through which can be inserted laterally projecting retaining fingers 21 on the upper sides of a removable partition assembly 22, which by means of connected longitudinal and transverse partitions 23 and 24, respectively, divides the interior of the tray into a plurality of longitudinally elongated compartments sized and arranged for protectively accommodating glasses, cups, or the like 25 and preventing them from excessive rolling or sliding or toppling into each other as the tray is handled, which would otherwise cause cracking or chipping.

Also aiding in the sterilizing of the glasses or the like 25 in the master tray 6, in longitudinal arrangement therein, are longitudinal concavities 26 formed in the wire mesh of the bottom 9 between laterally spaced longitudinal bars or wires 27 underlying the bottom and connected to the intermediate and end U-shaped members 16 and acting as additional parts of and reinforcements for the tray frame. The concavities 26 seat the glasses 25 and prevent their noisily or injuriously contacting each other.

Two vertical rectangular plates 28, disposed in parallel planes, are fixed at their lower edges to the upper longitudinal members 12 of the master tray frame. These plates 28, which are preferably imperforate, are of a width to extend a major portion of the length of the tray, with the vertical edges thereof equally spaced from the adjacent ends of the basket. These plates 28 aid in holding in place trays stacked on the master tray, and provide connections, at vertically spaced points, for the handle 8.

From a point near their lower ends to a point near their upper edges the plates 28 are formed with equally spaced pairs of holes 29 for connectively receiving portions of the handle 8, as hereinafter described.

The cover tray 7, of which more than one may be provided and utilized as a component of the unit 5, is or may be similar to the master tray 6, except that the plates 28 are omitted. Since the plates 28 are secured at the outer side of the upper longitudinal frame member 12 of the master tray 6, the cover tray 7 may be the full width of the master tray if desired, and of the same length and depth, so that the pressure of the cover tray resting upon the top of the master tray between the plates 28 assures not only secure support for the cover tray but complete closure of the open top of the subjacent master tray, as well as doubling of the capacity of tht unit 5.

A wire-mesh lid 30 having a frame 31 reinforcing its edges and having longitudinal members 33 may be provided to cover the master tray 6 in the absence of a cover tray 7 or to cover a cover tray 7 when superimposed upon the master tray 6, as shown in Figures 1 and 2.

The cover tray has eyes 34 on its upper longitudinal edges secured to its upper longitudinal frame members 12, rising thereabove and spaced to register with the holes 29 on the same level of the plates 28; and the lid 30 has similarly arranged eyes 35, for receiving portions of the handle 8.

The handle 8 comprises a pair of similar elongated rectangular frames 36, the upper portion of whose side members are crossed and pivoted, as indicated at 37, on the opposite ends of a spacer rod 38. The lower ends of the side members of these frames have angularly outwardly directed fingers 39, which are arranged to be inserted through the holes 29 in the plates 28, and when a cover tray 7 is in place on the master tray 6, as well as a lid 30, through the eyes 34 and 35 of the cover tray 7 and lid 30, respectively, for anchoring these in place against longitudinal or vertical shifting, and to provide connection for the handle in lifting, carrying, and handling the unit. The handle fingers 39 are engaged in the said holes and eyes by spreading the portions of the frames 36 above the pivots 37, and are withdrawn from the holes and eyes by bringing the upper portions of the frames 36 together.

The master tray 6, when used alone, may be manipulated by engaging the handle fingers 39 in any of the longitudinally aligned pairs of holes 29 in the plates 28, or a single cover tray 7, together with a lid 30 and a handle 8 may be used as a unit without the master tray 6. Similarly, the master tray 6 and one or more cover trays 7 may be manipulated, without using a lid 30, by engaging the handle fingers 39 through selected holes 29 in the plates 28 and through the eyes 34 of the cover trays, in which event the cover tray will be held down in place and prevented from shifting longitudinally relative to the master tray 6.

The glasses or the like 25 to be sterilized having been placed in any or all of the trays, and the handle 8 having been engaged therewith as described, the unit can be lowered, by grasping the upper part of the handle 8, into the container of boiling water so as to completely immerse the tray or trays therein, without the hands of the worker coming in contact with the hot water, and, after an appropriate interval, elevated out of the water by grasping the upper portions of the handle 8 and pulling upwardly thereon. The glasses or the like 25 having preferably been laid on their sides with their openings in one direction, so that the glasses can be drained of any remaining water by tilting the unit 5 in that direction. The upper portions of the handle are not appreciably heated by the immersion and the handle may be disconnected immediately without danger of burning the hands, and the tray or trays may be handled after a short wait and their contents removed without danger of burning the hands.

It will be evident from the foregoing that better, more efficient, and much quicker cleansing and sterilizing of glasses or the like may be done with the herein described unit. It will also be observed that a greater number of glasses or the like may be thus safely and conveniently processed at one time, by means of the herein described unit, than can be done by prior devices of this kind of substantially larger size and greater cost.

Various changes may be made to the form of the invention herein shown and described without departing from the spirit of the invention or scope of the claims.

What I claim is:

1. A unit for sterilizing drinking glasses or the like by immersion thereof in boiling water without manual contact with either the water or the glasses, said unit comprising a wire-mesh master tray arranged to receive the glasses or the like, lifting plates fixed to the sides thereof and rising therefrom in parallel planes, said plates being formed with vertically spaced pairs of horizontally aligned similar holes, and a handle comprising a pair of crossed and pivotally connected frames having pairs of laterally projecting fingers on their lower ends removably engaging in selected pairs of the holes in the lifting plates.

2. A unit for sterilizing drinking glasses or the like by immersion thereof in boiling water without manual contact with either the water or the glasses, said unit comprising a wire-mesh master tray arranged to receive the glasses or the like, lifting plates fixed to the sides thereof and rising therefrom in parallel planes, said plates being formed with vertically spaced pairs of horizontally aligned similar holes, and a handle comprising a pair of crossed and pivotally connected frames having pairs of laterally projecting fingers on their lower ends removably engaging in selected pairs of the holes in the lifting plates, a cover tray registered with and resting upon the top of said master tray between said plates and closing the top of said master tray so as to confine the glasses in said master tray, pairs of ears fixed on opposite sides of the top of said cover tray and substantially registering with the master tray plate holes in which the handle fingers are engaged, said handle fingers engaging in said ears so as to hold said cover tray down in place and prevent longitudinal shifting thereof relative to said master tray.

3. A unit for sterilizing drinking glasses or the like by immersion thereof in boiling water without manual contact with either the water or the glasses, said unit comprising a wire-mesh master tray arranged to receive the glasses or the like, lifting plates fixed to the sides thereof and rising therefrom in parallel planes, said plates being formed with vertically spaced pairs of horizontally aligned similar holes, and a handle comprising a pair of crossed and pivotally connected frames having pairs of laterally projecting fingers on their lower ends removably engaging in selected pairs of the holes in the lifting plates, a lid for and resting upon the top of said master tray between said plates, pairs of eyes fixed on the opposite sides of said lid and substantially registering with the holes in the plates through which said handle fingers are engaged, said handle fingers engaging in said eyes so as to hold the lid down in place and preclude shifting of said lid relative to said master tray.

4. A unit for sterilizing drinking glasses or the like by immersion thereof in boiling water without manual contact with either the water or the glasses, said unit comprising a wire-mesh master tray arranged to receive the glasses or the like, lifting plates fixed to the sides thereof and rising therefrom in parallel planes, said plates being formed with vertically spaced pairs of horizontally aligned similar holes, and a handle comprising a pair of crossed and pivotally connected frames having pairs of laterally projecting fingers on their lower ends removably engaging in selected pairs of the holes in the lifting plates, a cover tray registered with and resting upon the top of said master tray between said plates and closing the top of said master tray so as to confine the glasses in said master tray, pairs of ears fixed on opposite sides of the top of said cover tray and substantially registering with the master tray plate holes in which the handle fingers are engaged, said handle fingers engaging in said ears so as to hold said cover tray down in place and prevent longitudinal shifting thereof relative to said master tray, a lid for and resting upon the top of said cover tray between said plates, pairs of eyes fixed on opposite sides of said lid and substantially registering with the ears on the cover tray through which said handle fingers are engaged, said handle fingers engaging through the lid eyes and thereby holding said lid down in place on and preventing shifting of said lid relative to said cover tray.

5. A unit for sterilizing drinking glasses or the like by immersion thereof in boiling water without manual contact with either the water or the glasses, said unit comprising a wire-mesh master tray arranged to receive the glasses or the like, lifting plates fixed to the sides thereof and rising therefrom in parallel planes, said plates being formed with vertically spaced pairs of horizontally aligned similar holes, and a handle comprising a pair of crossed and pivotally connected frames having pairs of laterally projecting fingers on their lower ends removably engaging in selected pairs of the holes in the lifting plates, said pairs of handle frame fingers projecting in opposite laterally outward directions so that said pairs of fingers can be engaged in the holes in the lifting plates with said handle positioned between said plates by spreading the portions of the frames below their pivots away from each other by compressing the frame portions above the pivots toward each other, and disengaged from said holes by spreading said upper portions of the frames away from each other.

6. A unit for sterilizing drinking glasses or the like by immersion thereof in boiling water without manual contact with either the water or the glasses, said unit comprising a wire-mesh master tray arranged to receive the glasses or the like, lifting plates fixed to the sides thereof and rising therefrom in parallel planes, said plates being formed with vertically spaced pairs of horizontally aligned similar holes, and a handle comprising a pair of crossed and pivotally connected frames having pairs of laterally projecting fingers on their lower ends removably engaging in selected pairs of the holes in the lifting plates, said master tray comprising a wire-mesh form having a reinforcing frame comprising upper and lower longitudinal side members and upper and lower transverse end members, laterally spaced longitudinal bottom reinforcing members secured to and between said lower transverse end members, the wire mesh of the bottom of said master tray being depressed between said bottom reinforcing members to define longitudinal concavities in which the glasses are adapted to seat longitudinally so that adjacent glasses are maintained out of noisy or injurious contact with each other during the handling of the unit.

RAYMOND A. MOCK.

No references cited.